United States Patent
Ide

(10) Patent No.: US 6,919,798 B2
(45) Date of Patent: Jul. 19, 2005

(54) VEHICLE WHEEL INFORMATION OBTAINING APPARATUS AND WHEEL INFORMATION PROCESSING APPARATUS

(75) Inventor: Nobuhiro Ide, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 139 days.

(21) Appl. No.: 10/388,746

(22) Filed: Mar. 17, 2003

(65) Prior Publication Data

US 2003/0179082 A1 Sep. 25, 2003

(30) Foreign Application Priority Data

Mar. 19, 2002 (JP) ........................................ 2002-075517

(51) Int. Cl.[7] ........................ B60C 23/00; B60C 23/02
(52) U.S. Cl. ........................ 340/444; 340/442; 340/445; 340/447; 73/146.1; 73/146.2; 73/146.4; 73/146.5
(58) Field of Search ................................ 340/442–444, 340/445, 447, 448; 73/146.1, 146.2, 146.4, 146.5

(56) References Cited

U.S. PATENT DOCUMENTS

| 4,734,674 A | 3/1988 | Thomas et al. ............. 340/447 |
| 6,340,930 B1 | 1/2002 | Lin ............................. 340/447 |
| 6,362,731 B1 * | 3/2002 | Lill .............................. 340/445 |
| 2001/0050611 A1 | 12/2001 | Achterholt ................... 340/442 |
| 2003/0000296 A1 | 1/2003 | Schmitt ........................ 73/146 |

FOREIGN PATENT DOCUMENTS

| DE | 199 26 616 C2 | 12/2000 |
| DE | 199 51 273 A1 | 6/2001 |
| DE | 100 14 076 A1 | 10/2001 |
| JP | A 7-507513 | 8/1995 |
| JP | A 2000-142044 | 5/2000 |
| JP | A 2000-233615 | 8/2000 |
| JP | A 2000-238515 | 9/2000 |

* cited by examiner

Primary Examiner—Jeffery Hofsass
Assistant Examiner—Lam Pham
(74) Attorney, Agent, or Firm—Oliff & Berridge, PLC

(57) ABSTRACT

A vehicle wheel information obtaining apparatus for obtaining wheel information relating to a wheel of a vehicle. The apparatus includes: (a) a wheel state detector which detects a state of the wheel; (b) a transmitter which is provided on the wheel and which transmits a wheel data set containing a wheel state data representing the detected state of the wheel and a wheel identification data identifying the wheel; (c) a receiver which is provided on a vehicle body and which receives the wheel data set transmitted by the transmitter; (d) a data processor which processes the wheel data set received by the receiver; and (e) a communication-intensity reducing device which reduces a transmission strength of the transmitter or/and a reception sensitivity of the receiver, such that the transmission strength or/and the reception sensitivity is lower when the data processor is in an identification-data registering mode, than when the data processor is in a wheel-state data obtaining mode.

10 Claims, 3 Drawing Sheets

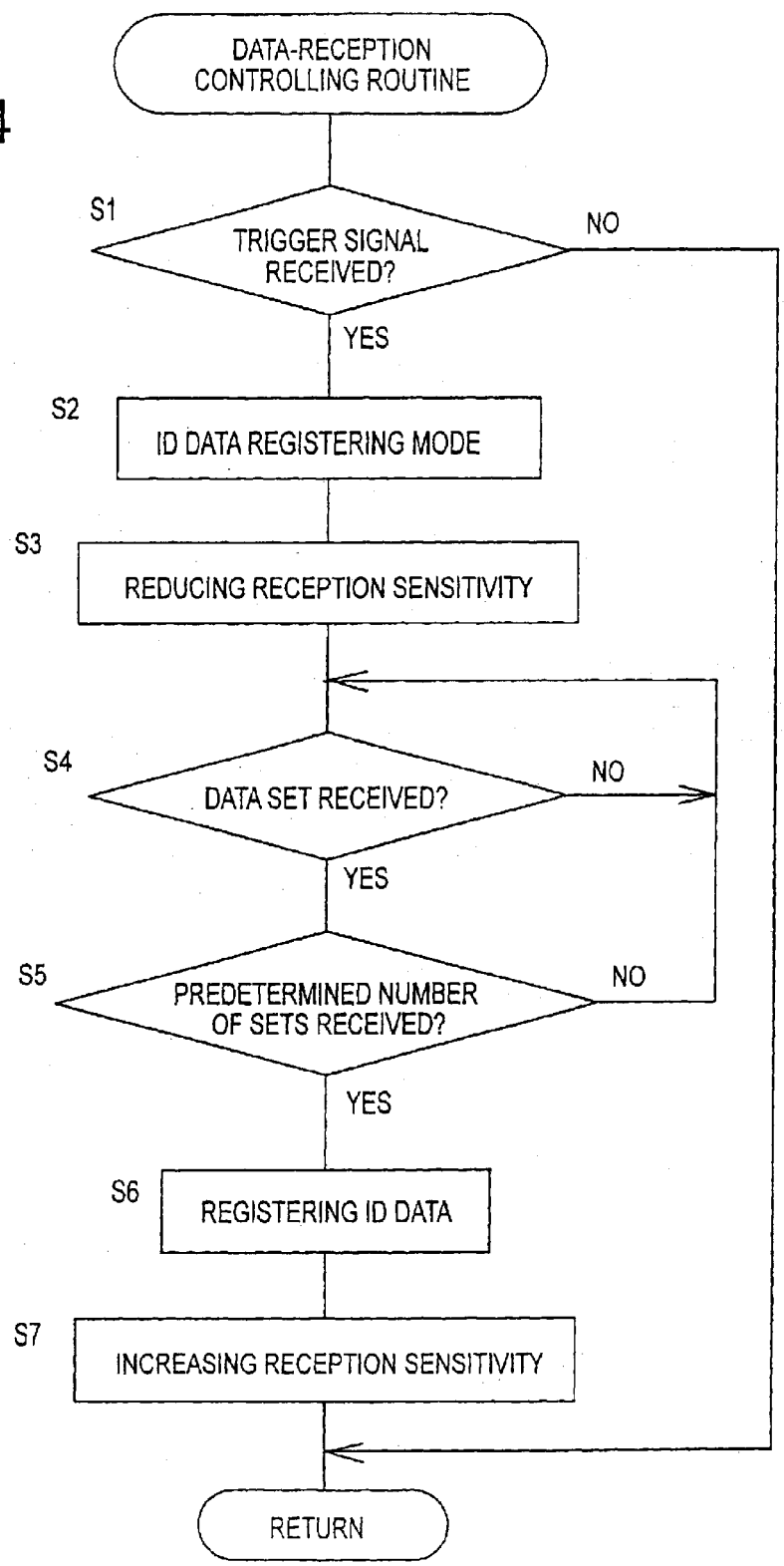

VEHICLE WHEEL INFORMATION OBTAINING APPARATUS AND WHEEL INFORMATION PROCESSING APPARATUS

This application is based on Japanese Patent Application No. 2002-075517 filed on Mar. 19, 2002, the content of which is incorporated hereinto by reference.

BACKGROUND OF THE INVENTION

1. Field of the Invention

The present invention relates in general to a vehicle wheel information obtaining apparatus for obtaining wheel information relating to a vehicle wheel, and more particularly to techniques for registration of an identification data identifying the wheel.

2. Discussion of Related Art

JP-A-2000-233615 discloses a vehicle wheel information obtaining apparatus to be installed on a vehicle, for registering wheel identification information identifying wheels of the vehicle. In this apparatus in which a data communication is established between each local unit provided on a corresponding one of the wheels and a central unit provided on a body of the vehicle, a number of receptions of each identification code by the central unit within a predetermined length of time is counted. It is determined that ones of the identification codes, each of which has been received a relatively large number of times within the predetermined length of time, has been transmitted from the respective wheels of the vehicle in question, rather than from wheels of another vehicle. Thus, the ones of the identification codes received by the central unit with relatively high frequency are registered as the wheel identification data identifying the wheels of the vehicle in question. This arrangement is effective to avoid an erroneous registration in which the identification codes transmitted from the other vehicle are registered as the wheel identification data, even if the other vehicle is positioned close to the vehicle in question.

However, this vehicle wheel information obtaining apparatus disclosed by the Japanese publication suffers from a problem that the apparatus requires a large length of time for completing the registration of the wheel identification information.

SUMMARY OF THE INVENTION

It is therefore an object of the present invention to provide a vehicle wheel information obtaining apparatus or a vehicle wheel information processing apparatus which is capable of registering the wheel identification information in a reduced length of time, while reliably avoiding an erroneous registration in which the identification codes transmitted from another vehicle are undesirably registered as the wheel identification data, even if the other vehicle is positioned close to the vehicle in question. This object may be achieved by a vehicle wheel information obtaining apparatus or a vehicle wheel information processing apparatus constructed according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A vehicle wheel information obtaining apparatus for obtaining wheel information relating to a wheel of a vehicle, the apparatus comprising:

a wheel state detector which is provided on the wheel and which detects a state of the wheel;

a transmitter which is provided on the wheel and which transmits a wheel data set, as the wheel information, containing a wheel state data representing the detected state of the wheel and a wheel identification data identifying the wheel;

a receiver which is provided on a body of the vehicle and which receives the wheel data set transmitted by the transmitter;

a data processor which processes the wheel data set received by the receiver, the data processor being selectively placed in an identification-data registering mode for registering the wheel identification data contained in the wheel data set, and a wheel-state data obtaining mode for obtaining the wheel state data contained in the wheel data set; and a communication-intensity reducing device which reduces at least one of a transmission strength of the transmitter and a reception sensitivity of the receiver, such that the above-described at least one of the transmission strength and the reception sensitivity is lower when the data processor is in the identification-data registering mode, than when the data processor is in the wheel-state data obtaining mode.

In the vehicle wheel information obtaining apparatus described in this mode (1), at least one of the transmission strength of the transmitter and the reception sensitivity of the receiver is reduced to be lower in the identification-data registering mode, than in the wheel-state-data obtaining mode. This arrangement is effective to avoid the receiver from receiving wheel data sets transmitted from another vehicle, and accordingly avoid an erroneous registration in which the wheel data sets of the other vehicle is undesirably registered. Further, this arrangement does not require a large length of time for correctly registering the wheel data sets, unlike the above-described conventional apparatus in which the registration is effected depending on the frequency of the reception of each wheel data set.

In the identification-data registering mode, either one of the transmission strength of the transmitter and the reception sensitivity of the receiver may be reduced. Where the transmission strength of the wheel data set transmitted from each wheel of the subject vehicle and that of the wheel data set transmitted from each wheel of the other vehicle (positioned close to the subject vehicle) are substantially equal to each other, the reduction in the reception sensitivity of the receiver (provided on the body of the subject vehicle) makes it possible to enable the receiver to receive the wheel data set transmitted from each wheel of the subject vehicle and to disable the receiver to receive the wheel data set transmitted from each wheel of the other vehicle. Thus, it is possible to avoid the wheel data sets, transmitted from the wheels of the other vehicle, from being erroneously registered as the wheel information. Further, where the reception sensitivity of the receiver of the subject vehicle and that of the receiver of the other vehicle are substantially equal to each other, the reduction in the transmission strengths of the wheel data sets transmitted from the subject vehicle and the other vehicle makes it possible to enable the receiver (provided on the body of the subject vehicle) to receive the wheel data set transmitted from each wheel of the subject vehicle and to disable the receiver to receive the wheel data set transmitted from each wheel of the other vehicle. In this case, too, it is possible to avoid the wheel data sets, transmitted from the wheels of the other vehicle, from being erroneously registered as the wheel information. It is noted that the term "wheel data set" may be referred also to as "tire data set".

(2) A vehicle wheel information obtaining apparatus according to mode (1), wherein the communication-intensity reducing device reduces the reception sensitivity of the receiver, such that the reception sensitivity is lower when the data processor is in the identification-data registering mode, than when the data processor is in the wheel-state data obtaining mode.

(3) A vehicle wheel information obtaining apparatus according to mode (1) or (2), further comprising:

a communication-intensity increasing device which is operable when registration of the wheel identification data is completed, to increase the above-described at least one of the transmission strength and the reception sensitivity that has been reduced by the communication-intensity reducing device.

In the vehicle wheel information obtaining apparatus of this mode (3), the above-described at least one of the transmission strength of the transmitter and the reception sensitivity of the receiver is increased after the registration of the identification data has been completed, so that the wheel state data is assuredly received by the receiver during the wheel-state data obtaining mode.

(4) A vehicle wheel information obtaining apparatus according to any one of modes (1)–(3), wherein each of at least one of the transmitter and the receiver is placed in a selected one of a plurality of different operation modes, and wherein the plurality of different operating modes include a relatively high intensity mode in which a corresponding one of the transmission strength and the reception sensitivity is relatively high, and a relatively low intensity mode in which a corresponding one of the transmission strength and the reception sensitivity is relatively low.

Each of the above-described at least one of the transmission strength of the transmitter and the reception sensitivity of the receiver may be variable continuously, or alternatively, changed in a plurality of steps. In the latter case, each of at least one of the transmitter and the receiver preferably has at least two operation modes including, for example, the relatively high intensity mode and the relatively low intensity mode, so that the relatively high intensity mode (e.g., a relatively high reception-sensitivity mode) can be established in response to the switching of the data processor from the identification-data registering mode to the wheel-state data obtaining mode, while the relatively low intensity mode (e.g., a relatively low reception-sensitivity mode) can be established in response to the switching of the data processor from the wheel-state data obtaining mode to the identification-data registering mode. It is noted that controlling or adjusting the reception sensitivity of the receiver provided on the vehicle body is easier than controlling or adjusting the transmission strength of the transmitter provided on the wheel.

(5) A vehicle wheel information obtaining apparatus according to any one of modes (1)–(4), wherein the communication-intensity reducing device reduces each of the above-described at least one of the transmission strength and the reception sensitivity, to a minimum level required to enable the wheel data set to be received by the receiver when a rotational speed of the wheel is not higher than a predetermined value.

In the vehicle wheel information obtaining apparatus of this mode (5), each of the above-described at least one of the transmission strength and the reception sensitivity is reduced to the minimum level required to enable the wheel data set to be received by the receiver when the rotational speed of the wheel is not higher than the predetermined value. This arrangement is effective to prevent the wheel data sets transmitted from the wheels of the other vehicle, from being received by the receiver of the subject vehicle. Since the registration of the identification data is made commonly when the vehicle is held stationary, the above-described predetermined value may be determined such that the vehicle is considered to be held substantially stationary when the rotational speed of the wheel is not higher than the predetermined value.

(6) A vehicle wheel information obtaining apparatus according to any one of modes (1)–(5), wherein the communication-intensity reducing device reduces each of the above-described at least one of the transmission strength and the reception sensitivity, to a minimum level required to enable the wheel data set to be received by the receiver when the receiver does not receive a noise whose level is higher than a predetermined value.

It is common that the level of the noise or other disturbance affecting the receiver is lower when the vehicle is held stationary, than when the vehicle is running. In the vehicle wheel information obtaining apparatus of this mode (6), each of the above-described at least one of the transmission strength and the reception sensitivity is reduced to the minimum level required to enable the wheel data set to be received by the receiver when the disturbance level is not higher than the predetermined value.

(7) A vehicle wheel information obtaining apparatus according to any one of modes (1)–(6), wherein the communication-intensity reducing device reduces each of the above-described at least one of the transmission strength and the reception sensitivity, to a level that enables the receiver to receive the wheel data set transmitted from the wheel of the vehicle and that disables the receiver to receive a wheel data set transmitted from a wheel of another vehicle.

(8) A vehicle wheel information obtaining apparatus for obtaining wheel information relating to a wheel of a vehicle, the apparatus comprising:

a wheel state detector which is provided on the wheel and which detects a state of the wheel;

a transmitter which is provided on the wheel and which transmits a wheel data set, as the wheel information, containing a wheel state data representing the detected state of the wheel and a wheel identification data identifying the wheel;

a receiver which is provided on a body of the vehicle and which receives the wheel data set transmitted by the transmitter;

a data processor which processes the wheel data set received by the receiver, the data processor having an identification-data registering mode for registering the wheel identification data contained in the wheel data set, and a wheel-state data obtaining mode for obtaining the wheel state data contained in the wheel data set; and a communication-intensity changing device which changes at least one of a transmission strength of the transmitter and a reception sensitivity of the receiver, such that the above-described at least one of the transmission strength and the reception sensitivity varies depending upon whether the data processor is in the identification-data registering mode or in the wheel-state data obtaining mode.

The technical feature described in any one of the above modes (1)–(7) is applicable to the vehicle wheel information obtaining apparatus of this mode (8).

(9) A vehicle wheel information processing apparatus for processing wheel information relating to a wheel of a vehicle, the apparatus comprising:

a receiver which is provided on a body of the vehicle and which receives a wheel data set, as the wheel information, containing a wheel state data representing a state of the wheel and a wheel identification data identifying the wheel;

a data processor which processes the wheel data set received by the receiver, the data processor having an identification-data registering mode for registering the wheel identification data contained in the wheel data set, and a wheel-state data obtaining mode for obtaining the wheel state data contained in the wheel data set; and a reception-sensitivity reducing device which reduces a reception sensitivity of the receiver, such that the reception sensitivity is lower when the data processor is in the identification-data registering mode, than when the data processor is in the wheel-state data obtaining mode.

The technical feature described in any one of the above modes (1)–(8) is applicable to the vehicle wheel information processing apparatus of this mode (9).

(10) A vehicle wheel information processing apparatus for processing wheel information relating to a wheel of a vehicle, the apparatus comprising:

a receiver which is provided on a body of the vehicle and which receives a wheel data set, as the wheel information, containing a wheel state data representing a state of the wheel and a wheel identification data identifying the wheel;

a data processor which processes the wheel data set received by the receiver; and a reception-sensitivity reducing device which reduces a reception sensitivity of the receiver, such that the reception sensitivity is lower when a rotational speed of the wheel is not higher than a predetermined value, than when the rotational speed of the wheel is higher than the predetermined value.

The technical feature described in any one of the above modes (1)–(9) is applicable to the vehicle wheel information processing apparatus of this mode (10).

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which:

FIG. 4 is a flow chart illustrating a data-reception controlling routine executed according to a control program stored in a memory of the wheel information obtaining apparatus.

DETAILED DESCRIPTION OF THE PREFERRED EMBODIMENTS

Figure 1:
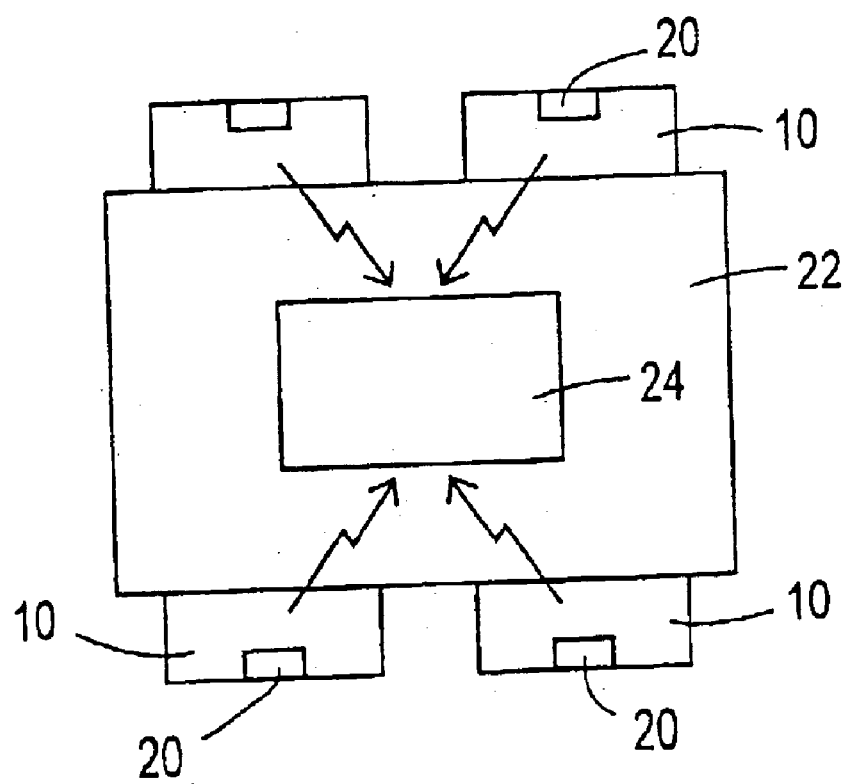
FIG. 1 is a schematic view showing a vehicle equipped with a wheel information obtaining apparatus which is constructed according to an embodiment of this invention.
Figure 2:
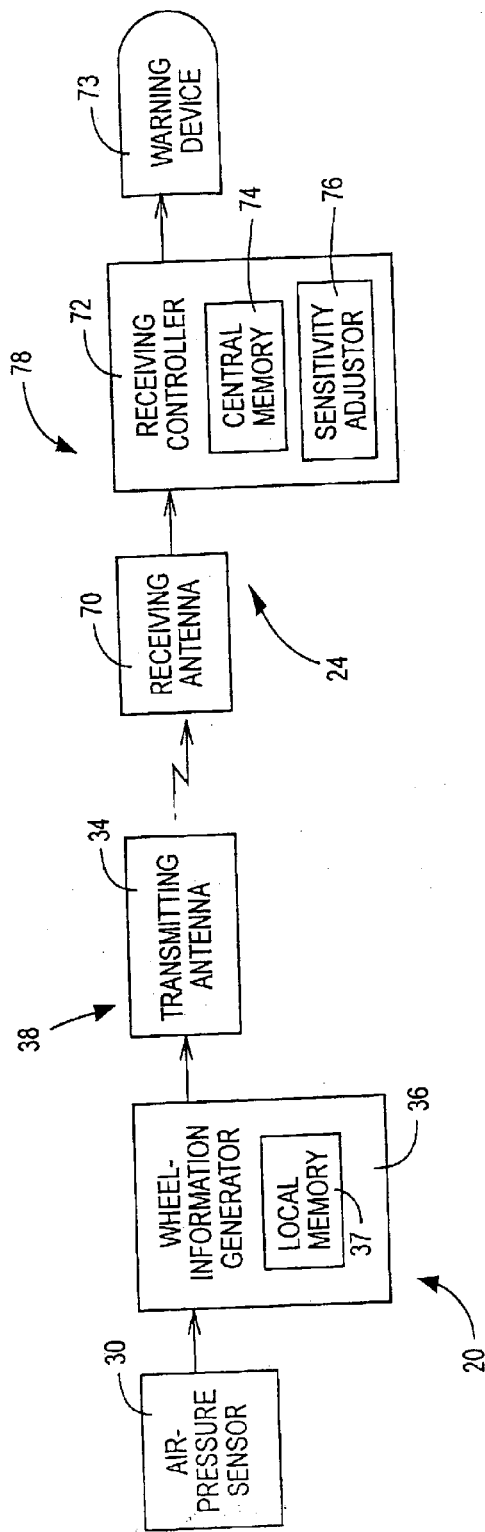
FIG. 2 is a block diagram showing the wheel information obtaining apparatus of FIG. 1.

Referring to first to FIGS. 1 and 2, there is shown a wheel information obtaining apparatus which is constructed according to an embodiment of this invention. As shown in FIG. 1, four tired wheels 10 are mounted as mounted wheels on axles of a vehicle which is provided with the wheel information obtaining apparatus, such that the four wheels serve as front right and left wheels FR, FL and rear right and left wheels RR, RL. Each of the wheels 10. Is provided with a local unit 20, while a body 22 of the vehicle is provided with a central unit 24. A radio communication is established between each local unit 20 and the central unit 24, namely, between each wheel 10 and the vehicle body 22. As shown in FIG. 2, each local unit 20 includes: an air pressure sensor 30 for detecting an air pressure of a tire of the corresponding wheel 10; a transmitting antenna 34 for transmitting a series of tire information in the form of a wheel data set 50 which contains an air pressure data representing the air pressure detected by the air pressure sensor 30 and an identification data identifying the corresponding wheel 10; and a wheel information generator 36 for generating the wheel data set. The wheel information generator 36 is constituted principally by a computer including a local memory 37 and input and output portions. To the input portion, there is connected the air pressure sensor 30. To the output portion, there is connected the transmitting antenna 34. The memory 37, constituted principally by a ROM and a RAM, serves as a data storage to store various information such as the above-described identification data. In the present embodiment of the invention, the transmitting antenna 34 and the wheel information generator 36 constitute a major portion of the transmitter 38.

Figure 3:
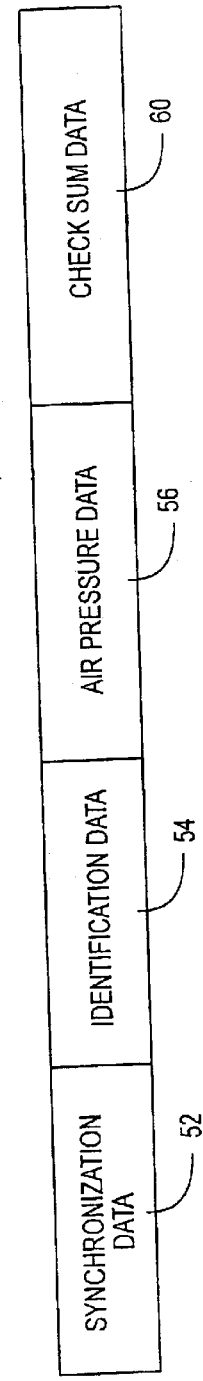
FIG. 3 is a view illustrating wheel information in the form of a wheel data set.

As shown in FIG. 3, the wheel data set 50 includes a header data in the form of a synchronization data 52, an identification data 54, an air pressure data 56 and a check sum data 60. The synchronization data 52 is provided for synchronization of the transmitter 38 with a receiver. The identification data 54 is provided to identify each of the wheels 10 from which the wheel data set 50 is transmitted. That is, the identification data 54 serves to confirm that the wheel identified by the same data 54 is one of the wheels of the vehicle in question rather than of another vehicle. The check sum data 60 is provided for effecting a parity check or for otherwise checking an actual total volume of the wheel data set 50 transmitted from the transmitter. While a wheel state data is provided by the air pressure data 56 in the present embodiment of the invention, the state data may be provided by, in addition to the air pressure data 56, other data elements such as a tire temperature data representative of a temperature of the tire, an applied-force data representative of a force applied to the wheel in a transversal, longitudinal or vertical direction of the vehicle, a shape data representative of a shape of the tire, and a local-unit state data representative of a state of the local unit 20 such as a residual amount of electric energy left in a battery used in the local unit 20. The air pressure of the tire is detected by the air-pressure sensor 30 at predetermined time intervals, so that the wheel information generator 36 generates the wheel data set 50 which contains the air pressure data 56 representative of the detected air pressure and the identification data 54 stored in the memory 37. The generated wheel data set 50 is transmitted from the transmitting antenna 34 to the central unit 24.

The central unit 24 provided in the vehicle body 22 includes a receiving antenna 70 for receiving the wheel data sets 50 transmitted from the respective local units 20, a warning device 73, and a receiving controller 72 constituted principally by a computer including a central memory 74 and input and output portions. To the input and output portions of the receiving controller 72, there are connected the receiving antenna 70 and the warning device 73, so that the receiving controller 72 processes the wheel data sets received by the receiving antenna 70. The memory 74, which is provided by a non-volatile data storage, stores the identification data of each wheel data set and also various control programs such as a program for executing a data-reception routine which is illustrated by the flow chart of FIG. 4. The receiving controller 72 further includes a communication-intensity changing or reducing device in the form of a sensitivity adjustor 76 for adjusting a reception sensitivity of the central unit 24. In the receiving controller 72, signals supplied from the receiving antenna 70 are subjected to predetermined processing operations such as filtering and amplification, and each of the signals is adapted to have an intermediate frequency. Then, each signal is converted into a digital signal, after a level of each signal has been compared with a reference (threshold) level in a comparator. In the present embodiment, a voltage level of each signal received by the receiving antenna 70 is detected, so that the signal is not processed if the detected voltage level is lower than a target voltage level. That is, the reception sensitivity of the receiver 78 is made lower when the target voltage level is relatively high, than when the target voltage level is relatively low. The actual voltage level of each signal received by the receiving antenna 70 is detected at terminals of IC provided for the intermediate frequency processing, and the detected voltage level is compared with the target voltage level in the comparator.

In the present embodiment, the sensitivity adjustor 76 is constituted by the terminals, comparator and means for changing the target voltage level. The receiving antenna 70 and the receiving controller 72 constitute a receiver 78. The receiving controller 72 constitutes a vehicle wheel information processing apparatus. It is also possible to consider that the receiver 78 is constituted by the receiving antenna 70 and a portion of the receiving controller 72 which relates to the reception of the wheel data sets 50, and that the vehicle wheel information processing apparatus is constituted by a portion of the receiving controller 72 which is assigned to process the wheel data sets 50.

The receiving controller 72 is selectively placed in an identification-data registering mode and an air-pressure data obtaining mode. When the receiving controller 72 is in the identification-data registering mode, a content of the identification data 54 contained in each wheel data set 50 is stored in the memory 74 of the central unit 24. This identification-data registering mode is selected, for example, when a new wheel or wheels are mounted on the axle or axles of the vehicle in a factory of vehicle production, or when one of the wheels is replaced with another wheel in a repair shop. When the receiving controller 72 is in the air-pressure data obtaining mode, a content of the air pressure data 56 contained in each wheel data set 50 is read by the receiving controller 72. The detected value of the air pressure represented by the air pressure data 56 is compared with a predetermined minimum value, so that the warning device 73 is activated if the detected value is lower than the predetermined minimum value. In this instance, it is determined whether the content of the identification data 54 of each wheel data 50 received by the receiving antenna 50 coincides with the content of the identification data which has been stored in the memory 74. If the currently received content of the identification data 54 coincides with the stored content of the identification data 54, it is determined that the wheel data set 50 is determined to have been transmitted from one of the wheels of the subject vehicle, whereby the wheel data set 50 is proceed as described above. If the currently received contend of the identification data 54 does not coincide with the stored content of the identification data 54, the wheel data set 50 is not processed.

In the present embodiment, the reception sensitivity of the receiver 78 is reduced to be lower when the identification-data registering mode is being established, than when the air-pressure data obtaining mode is being established. Owing such an adjustment of the reception sensitivity of the receiver 78, the receiver 78 receives the wheel data sets 50 transmitted from the wheels 10 of the vehicle in question but does not receive wheel data sets transmitted from the wheels of another vehicle, i.e., a vehicle positioned close to the vehicle in question.

With the identification-data registering mode being established, the reception sensitivity of the receiver 78 is reduced to a minimum level required to enable the receiver 78 to receive the wheel data sets 50 when the vehicle stays inside a building (e.g., a factory building) with the wheels 10 being not rotated or rotated at a speed not higher than a predetermined value (namely, with the wheels 10 being held substantially stationary). When the vehicle stays inside a building (rather than on an ordinary road) with the wheels 10 being held substantially stationary (rather than being rotated), the receiver 78 does not receive a large noise or other large disturbance which would interfere or affect the function of the receiver 78. In this instance, the level of a small noise received by the receiver 78 can be previously estimated, for example, in view of a construction of the receiver 78, while an output strength of the transmitting antenna 34 is a known value. Therefore, the above-described minimum level of the reception sensitivity of the receiver 78 can be determined principally based on the environment and the construction of the receiver 78.

After the registration of the identification data has been completed, the reception sensitivity of the receiver 78 is increased by the sensitivity adjustor 76, whereby the wheel data sets 50 can be reliably received by the receiver 78 when the vehicle is running on a road, namely, when the receiver 78 is subjected to a large disturbance. It is noted that the receiver 78 may be adjustable by the sensitivity adjustor 76, such that the reception sensitivity of the receiver 78 is adjustable to a selected one of two levels (i.e., a relatively high level and a relatively low level), or alternatively, such that the reception sensitivity of the receiver 78 is continuously variable.

The switching of the receiving controller 72 from the air-pressure data obtaining mode to the identification-data registering mode may be effected in response to a switch requesting signal transmitted from a device that is connected with the central unit 24, or alternatively, may be effected in response to a switch requesting signal that is transmitted from one of the local units 20 when the change rate of the air pressure of the corresponding tire is equal to or higher than a predetermined value. In either of these two arrangements, the switching is effected in response to the switch requesting signal (trigger signal) supplied to the central unit 24.

The data-reception routine, which is illustrated by the flow chart of FIG. 4, is initiated with step S1 to determine whether the switch requesting signal (trigger signal) has been detected or received by the central unit 24. If an affirmative decision is obtained in step S1, step S2 is implemented to switch the receiving controller 72 from the air-pressure data obtaining mode to the identification-data registering mode. Step S2 is followed by step S3 in which the reception sensitivity of the receiver 78 is reduced by the sensitivity adjustor 76. With the reception sensitivity being held in the relatively low level, the transmission of the wheel data set 50 from the transmitter 38 of each local unit 20 (which is effected constantly at a predetermined time interval) is awaited by the receiver 78 of the central unit 24. Thus, the receiving antenna 70 of the receiver 78 receives the wheel data sets 50 transmitted from the respective transmitters 38 of the local units 20. Steps S4 and S5 are implemented to determine whether a number of the received wheel data sets 50 has reached a predetermined number, i.e., a number of the tires mounted on the vehicle. If the number of the received wheel data sets 50 has reached the predetermined number, step S6 is implemented whereby the identification data 54 contained in each of the wheel data sets 50 is stored in the central memory 74. Thereafter, step S7 is implemented whereby the reception sensitivity of the receiver 78 is increased so that the identification-data registering mode is changed back to the air-pressure data obtaining mode.

As is apparent from the above description, the vehicle wheel information obtaining apparatus constructed according to the present embodiment in which the reception sensitivity of the receiver 78 is reduced, the identification data actually transmitted from another vehicle is prevented from being erroneously registered as if it were the identification data transmitted from the subject vehicle, even where the other vehicle is positioned close to the subject vehicle. Further, the present apparatus does not require a large length of time for correctly registering the identification data, unlike the above-described conventional apparatus. The erroneous registration (in which the identification data transmitted from the other vehicle is registered) might be prevented by an arrangement in which a format of the wheel data set is variable depending upon whether the receiving controller 72 is currently placed in the identification-data registering mode or the air-pressure data obtaining mode. However, in the present apparatus, the erroneous registration can be reliably avoided, even without such an arrangement, namely, even if the transmitter is not capable of varying the format of the wheel data set.

While the reception sensitivity of the receiver 78 is reduced in the apparatus of the present embodiment, the transmission strength of the transmitter 38 may be reduced in addition to or in place of the reduction of the reception sensitivity of the receiver 78. In a vehicle production line in which a large number of vehicles are produced, there is a case where wheels are simultaneously mounted on axles of a plurality of vehicles, whereby the identification-data registrations are effected simultaneously in the plurality of vehicles. Even in such a case, there is no risk that the receiver provided in the body of each vehicle receives the wheel data set transmitted from the other vehicle, if the transmission strengths of the transmitters of all the vehicles are reduced. Further, the content of the identification data transmitted from each wheel does not have to be stored directly into the memory 74. For example, where the content (number) of the identification data is constituted by two or more binary digits, a number to be stored may be a radix complement or a radix-minus-one complement of the content (number).

The principle of the present invention is equally applicable to a vehicle wheel information obtaining apparatus having a provision for registering the identification data depending upon the frequency of the reception of the identification data, or a vehicle wheel information obtaining apparatus having a provision for varying a format of the wheel data set depending upon whether the receiving controller is currently placed in the identification-data registering mode or the air-pressure data obtaining mode. In either of these cases, the identification data transmitted from each wheel of the subject vehicle is more reliably registered. It is to be understand that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A vehicle wheel information obtaining apparatus for obtaining wheel information relating to a wheel of a vehicle, said apparatus comprising:

a wheel state detector which is provided on the wheel and which detects a state of the wheel;

a transmitter which is provided on the wheel and which transmits a wheel data set, as said wheel information, containing a wheel state data representing the detected state of the wheel and a wheel identification data identifying the wheel;

a receiver which is provided on a body of the vehicle and which receives said wheel data set transmitted by said transmitter;

a data processor which processes said wheel data set received by said receiver, said data processor having an identification-data registering mode for registering said wheel identification data contained in said wheel data set, and a wheel-state data obtaining mode for obtaining said wheel state data contained in said wheel data set; and a communication-intensity reducing device which reduces at least one of a transmission strength of said transmitter and a reception sensitivity of said receiver, such that said at least one of said transmission strength and said reception sensitivity is lower when said data processor is in said identification-data registering mode, than when said data processor is in said wheel-state data obtaining mode.

2. A vehicle wheel information obtaining apparatus according to claim 1, wherein said communication-intensity reducing device reduces said reception sensitivity of said receiver, such that said reception sensitivity is lower when said data processor is in said identification-data registering mode, than when said data processor is in said wheel-state data obtaining mode.

3. A vehicle wheel information obtaining apparatus according to claim 1, further comprising:

a communication-intensity increasing device which is operable when registration of said wheel identification data is completed, to increase said at least one of said transmission strength and said reception sensitivity that has been reduced by said communication-intensity reducing device.

4. A vehicle wheel information obtaining apparatus according to claim 1, wherein each of at least one of said transmitter and said receiver is placed in a selected one of a plurality of different operation modes, and wherein said plurality of different operating modes include a relatively high intensity mode in which at least one of said transmission strength and said reception sensitivity is relatively high, and a relatively low intensity mode in which at least one of said transmission strength and said reception sensitivity is relatively low.

5. A vehicle wheel information obtaining apparatus according to claim 1, wherein said communication-intensity reducing device reduces each of said at least one of said transmission strength and said reception sensitivity, to a minimum level required to enable said wheel data set to be received by said receiver when a rotational speed of the wheel is not higher than a predetermined value.

6. A vehicle wheel information obtaining apparatus according to claim 1, wherein said communication-intensity reducing device reduces each of said at least one of said transmission strength and said reception sensitivity, to a minimum level required to enable said wheel data set to be received by said receiver when said receiver does not receive a noise whose level is higher than a predetermined value.

7. A vehicle wheel information obtaining apparatus according to claim 1, wherein said communication-intensity reducing device reduces each of said at least one of said transmission strength and said reception sensitivity, to a level that enables said receiver to receive said wheel data set transmitted from the wheel of the vehicle and that disables said receiver to receive a wheel data set transmitted from a wheel of another vehicle.

8. A vehicle wheel information obtaining apparatus for obtaining wheel information relating to a wheel of a vehicle, said apparatus comprising:

a wheel state detector which is provided on the wheel and which detects a state of the wheel;

a transmitter which is provided on the wheel and which transmits a wheel data set, as said wheel information, containing a wheel state data representing the detected state of the wheel and a wheel identification data identifying the wheel;

a receiver which is provided on a body of the vehicle and which receives said wheel data set transmitted by said transmitter;

a data processor which processes said wheel data set received by said receiver, said data processor having an identification-data registering mode for registering said wheel identification data contained in said wheel data set, and a wheel-state data obtaining mode for obtaining said wheel state data contained in said wheel data set; and a communication-intensity changing device which changes at least one of a transmission strength of said transmitter and a reception sensitivity of said receiver, such that said at least one of said transmission strength and said reception sensitivity varies depending upon whether said data processor is in said identification-data registering mode or in said wheel-state data obtaining mode.

9. A vehicle wheel information processing apparatus for processing wheel information relating to a wheel of a vehicle, said apparatus comprising:

a receiver which is provided on a body of the vehicle and which receives a wheel data set, as said wheel information, containing a wheel state data representing a state of the wheel and a wheel identification data identifying the wheel;

a data processor which processes said wheel data set received by said receiver, said data processor having an identification-data registering mode for registering said wheel identification data contained in said wheel data set, and a wheel-state data obtaining mode for obtaining said wheel state data contained in said wheel data set; and a reception-sensitivity reducing device which reduces a reception sensitivity of said receiver, such that said reception sensitivity is lower when said data processor is in said identification-data registering mode, than when said data processor is in said wheel-state data obtaining mode.

10. A vehicle wheel information processing apparatus for processing wheel information relating to a wheel of a vehicle, said apparatus comprising:

a receiver which is provided on a body of the vehicle and which receives a wheel data set, as said wheel information, containing a wheel state data representing a state of the wheel and a wheel identification data identifying the wheel;

a data processor which processes said wheel data set received by said receiver; and a reception-sensitivity reducing device which reduces a reception sensitivity of said receiver, such that said reception sensitivity is lower when a rotational speed of the wheel is not higher than a predetermined value, than when the rotational speed of the wheel is higher than the predetermined value.

* * * * *